United States Patent [19]
Forry

[11] Patent Number: 5,611,549
[45] Date of Patent: Mar. 18, 1997

[54] GASKET STRUCTURE WITH TAPERED BOLT AREA DENSIFICATION

[75] Inventor: John S. Forry, Lancaster, Pa.

[73] Assignee: Armstrong World Industries, Inc., Lancaster, Pa.

[21] Appl. No.: 579,593

[22] Filed: Dec. 26, 1995

[51] Int. Cl.⁶ ................................................. F16J 15/10
[52] U.S. Cl. .................................... 277/180; 277/235 B
[58] Field of Search ....................... 277/170, 180, 277/227, 235 B; 411/542, 907

[56] References Cited

U.S. PATENT DOCUMENTS

| | | | |
|---|---|---|---|
| 3,355,181 | 11/1967 | Olson | 277/227 |
| 3,655,210 | 4/1972 | Farnam et al. | 277/235 B |
| 3,661,401 | 5/1972 | Farnam | 277/227 |
| 3,854,736 | 12/1974 | Farnam | 277/227 |
| 3,863,936 | 2/1975 | Farnam et al. | |
| 4,535,999 | 8/1985 | Locacius | |
| 4,688,809 | 8/1987 | Deppe | 277/180 |
| 4,702,657 | 10/1987 | Jelinek | 411/542 |
| 5,011,162 | 4/1991 | Jelinek | 411/542 |
| 5,188,495 | 2/1993 | Jones, Jr. | 411/542 |

*Primary Examiner*—Scott Cummings

[57] ABSTRACT

A compressible gasket is provided which has at least one bolt area with a tapered densification. The tapered densification puts the lowest porosity at a center area of the bolt area. The center area is that part of the bolt area which surrounds and abuts the bolt aperture itself, and in use is covered by the bolt head. Two embodiments are provided. In one the gasket will have a substantially uniform porosity throughout the center area underneath the bolt head. In the more preferred embodiment, the densification gradually decreases in a porosity gradient beginning at the aperture and going through the center area.

8 Claims, 1 Drawing Sheet

GASKET STRUCTURE WITH TAPERED BOLT AREA DENSIFICATION

BACKGROUND OF THE INVENTION

1. Field of the Invention

The present invention relates to a structured fibrous gasket. More particularly the fibrous gasket sheet has at least one bolt area in the structure, the bolt area having a tapered densification.

Gasketing is required to provide a seal between flange areas of motors. A good seal must be achieved initially, and in addition to this, the seal must be maintained to give the gasket a good seal throughout its life. To maintain a seal, retaining bolt stretch is important. Thus, a further requirement is that the gasket should retain bolt stretch during use. The bolt areas of the gasket are known to have problems such as the retention of bolt stretch and thereby not providing an adequate long term seal to the flange.

It has been found that when inserts are put into the gasket bolt areas to add at least partial densification to the gasket structure then an appropriate seal and good bolt stretch retention can be achieved in the gasket. References can be found which teach the use of inserts and washers in the bolt locations of gaskets. In particular, U.S. Pat. No. 3,863,936 teaches that the bolt hole areas are densified in part by embedded steel washers in the gasket body to minimize carburetor flange flexing and maintain high torque retention under heat. According to this reference, when the clamping bolts are brought down upon the densified bolt hole areas with an embedded washer, they provide appropriate sealing, conformability and deflection characteristics.

Another reference is U.S. Pat. No. 4,535,999. This patent teaches that a grommet can be positioned in a clear-through opening, the grommet being a sealing member which comprises a metallic insert having upper and lower surfaces and compressible material on each of the upper and lower surfaces.

When such inserts are used around the bolt holes of gaskets, however, the gasket disadvantageously lacks conformity to the flange. This lack of conformity to the flange, of course, results in a lower sealing ability. It would be advantageous to provide a gasket structure which has good bolt stretch retention and provides a superior seal to the flange.

It is, therefore, an object of the present invention to provide a gasket structure with good bolt stretch retention and good sealing ability. Other objects will be apparent from this description to those of ordinary skill in the art.

SUMMARY OF THE INVENTION

A compressible gasket is provided which has at least one bolt area with a tapered densification. The tapered densification puts the lowest porosity at a center area of the bolt area. The center area is that part of the bolt area which surrounds and abuts the bolt hole (aperture) itself, and in use is covered by the bolt head.

Two embodiments of the present invention are provided. In one, the gasket will have a substantially uniform porosity throughout the center area underneath the bolt head. In the more preferred embodiment, the densification gradually decreases in a porosity gradient beginning at the aperture and going through the center area.

In either embodiment, a porosity gradient is present. This porosity gradient has its highest porosity at the outer point of the bolt area, and, proceeding in a straight line toward the center area, the porosity decreases gradually. In any embodiment, the porosity will be lower abutting the center area of the bolt area than it is at the outer point of the bolt area away from the center area. The porosity gradient is at least about 2 millimeters (mm) long since it is at least about 2 mm from the end of the center area of the bolt area to the end of the bolt area. Preferably, the gradient is at least about 3.5 mm long.

In the most preferred embodiment, the porosity gradient continues to go through the center area to the bolt aperture. In any embodiment, the center area abutting the bolt aperture will have the lowest porosity. Thus, in the preferred embodiment, proceeding in a straight line beginning at the bolt aperture and going to the outside edge of the bolt area, the porosity gradually increases (densification decreases). In the preferred embodiment, this porosity gradient (the gradual increase in porosity) goes directly through the center area of the bolt area and then proceeds through the rest of the bolt area outside of the center.

The "bolt area" is that part of the compressible gasket which is around the bolt aperture and extends a minimum of about 2 mm beyond the point where the bolt head will stop overlapping the gasket. Preferably, it extends a minimum of about 3.5 mm beyond the bolt head. With the present invention, the "bolt area" extends from the aperture to that point on the compressible gasket where the gasket was not compressed by the added pressure which gave the gasket a porosity gradient.

The "center area" is that part of the bolt area which totally surrounds the bolt aperture, and on the gasket it is an area which is overlapped by the bolt head when the bolt is placed through the aperture. The bolt area outside of the center area is not overlapped by the bolt head, but it does have a tapered porosity. As previously indicated, the center area of the bolt area can either have a substantially uniform porosity, or it can have the preferred tapering porosity where the porosity gradient continues through the center area and ends at the bolt aperture.

The gradual tapering of the porosity in the bolt area, provided by the instant invention, should be distinguished from a densified area of low porosity which abruptly changes from a lower porosity in the bolt area to the higher porosity of the rest of the gasket structure.

Any compressible gasket can be given a tapered densification in at least one bolt area of the compressible gasket by a process comprising the steps of providing a compressible gasket sheet material with at least one aperture for the bolt to be placed in, the aperture being in a center area of the bolt area, and pressing the compressible gasket sheet material on the bolt area. Preferably, heat is used when the compressible gasket is pressed.

The pressing is done with a means for pressing which puts uneven pressure on the bolt area of the compressible gasket sheet material. This uneven pressure specifically puts heavier pressure on the compressible gasket sheet material which is at the center area, and further puts lighter pressure on the gasket in the bolt area outside of the center area so that the pressure tapers from heavy to lighter and finally to substantially zero.

In one embodiment, the pressure will be the heaviest but substantially the same throughout the center area of the bolt area to give the bolt area its most dense area (around the bolt aperture and under the bolt head). Then, from the end of the center area to the end of the bolt area, the pressure goes from heavy to lighter in a gradient which goes through the bolt area for a minimum distance of about 2 mm beyond that center area (preferably 3.5 mm) before the pressure reaches substantially zero. This pressure gives the gasket a bolt area having a center area where the porosity is lowest but substantially the same, and which further has a porosity gradient in the bolt area abutting and surrounding the center area, the gradient being at least about 2 mm long. Preferably, the gradient is at least about 3.5 mm long.

In the preferred embodiment, the pressure is most heavy around the bolt aperture and it gets lighter proceeding through the center area of the bolt area and continues to get lighter proceeding, for a minimum distance of at least about 2 mm (preferably 3.5 mm), through the bolt area to where the pressure on the compressible gasket finally reaches substantially zero. In this embodiment the pressure gives the gasket a bolt area having the lowest porosity in the center area abutting the aperture and a porosity gradient which continues through the center area and for at least about 2 mm beyond it.

The pressure on the compressible gasket is considered to be "substantially zero" when the pressure does not compress the gasket.

From the foregoing processes, in either embodiment, the center area has the lowest porosity of the porosity gradient. The aperture can be cut in the gasket sheet material either before or after the pressing is done to create the gradient. The highest porosity of the gradient will be in the bolt area outside of the center area where the bolt area ends.

DETAILED DESCRIPTION

Figure 1:
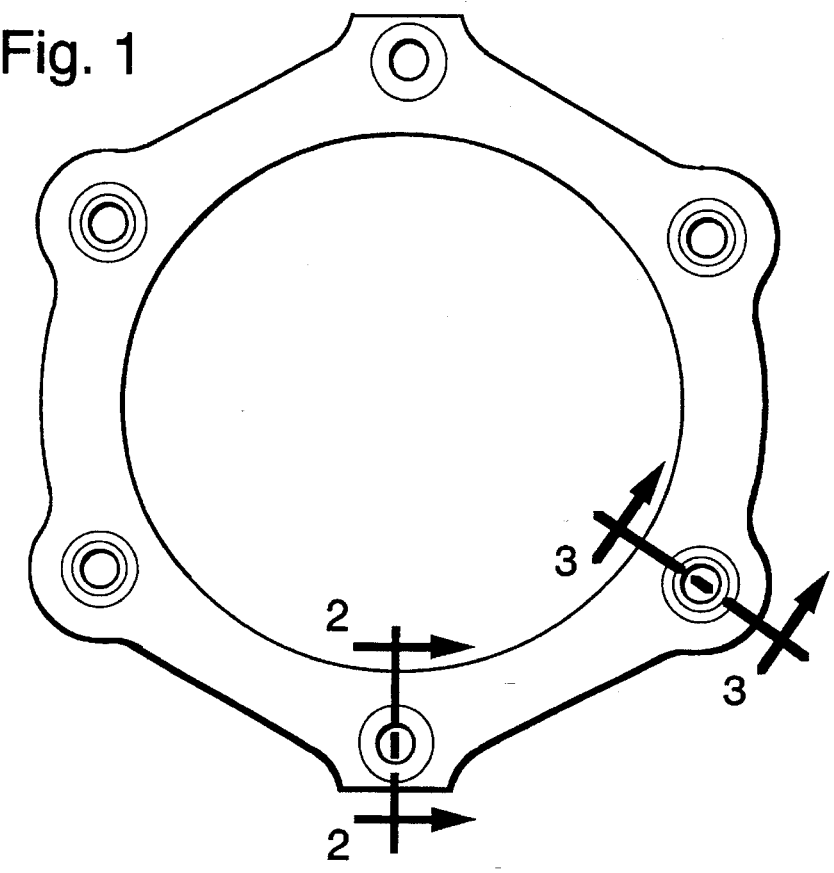
FIG. 1 shows a gasket which has both embodiments of the densified bolt areas of the present invention.
Figure 2:
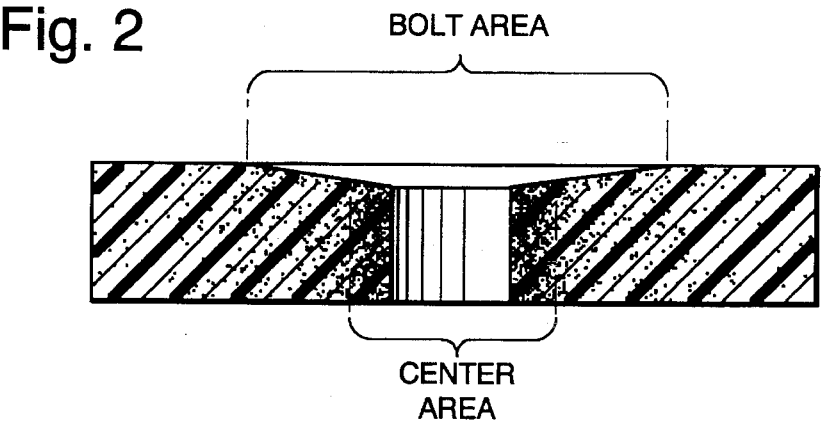
FIG. 2 shows the preferred embodiment where the porosity gradient is between the aperture and the end of the bolt area. The porosity gradient goes through the center area from the aperture. The lowest porosity is at that part of the gradient which is near the aperture, and the highest porosity of the gradient is at the end of the pressed area where the bolt area ends.
Figure 3:
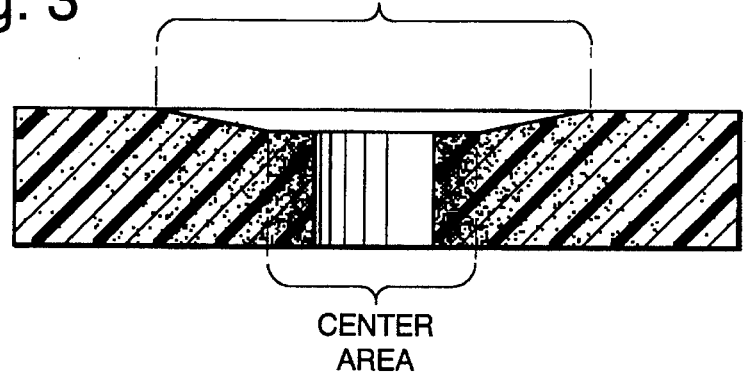
FIG. 3 shows the embodiment of the present invention where the porosity gradient does not continue through the center area. One end of the gradient abuts the center area. The gradient goes from the outside of the center area to the end of the bolt area where the pressed area ends. The center area of this embodiment has a substantially uniform porosity throughout.

The term "porosity gradient" used herein means that there is a change in the value of the porosity over distance. Specifically, porosity changes its value by decreasing per unit of distance going through the bolt area toward the center area and the aperture.

While the discussion herein is put largely in terms of porosity, the terms "densification" and "tapered densification" are also used. The terms "densification" and "porosity" really refer to the same characteristic of the bolt area. In the present case, "densification" refers to the state of being more dense in the bolt area than the gasket is in areas outside of the bolt area. The statement that the gasket has a "tapered densification" in the bolt area refers to the gradual change in density (a gradient). Densification is tapered since, with both embodiments, there is a porosity gradient in the bolt area beginning at the outer edge of the center area of the bolt area and going away from the aperture to where the bolt area ends.

Any compressible gasket material can be subjected to the process described herein and can thereby be given the tapering densification in the bolt area. Fibrous gaskets, in general, are compressible and are suitable as gasketing of the present invention. Preferred gasketing for the instant process comprises fiber, binder, and filler. Most preferably a gasket of the instant invention is a wet laid sheet material which includes the fiber, binder, and filler.

The most preferred wet laid gasketing material will generally have a porosity in the range of from about 20 to about 50% (by volume) after it has been laid, dried, and calendered.

In the process a sufficient amount of pressure can easily be used to put the porosity down to a preferred level of about 15% or less (by volume). While it is difficult to completely eliminate porosity, it is relatively easy to use enough pressure to reduce the porosity to a level in the range of from about 5 to about 15%.

For either embodiment, the center area of the bolt area will preferably have a porosity in the range of from about 1 to about 15% by volume. In one embodiment, the center area has a substantially uniform porosity. The porosity gradient in this embodiment begins at the end of the center area. In the other, more preferred embodiment, as previously indicated, going away from the aperture of the bolt area, through the center area, the porosity will gradually increase, the gradient beginning at the aperture. From the end of the center area through the outer part of the bolt area to where the bolt area ends, in any embodiment the porosity will increase from the lower to the higher, preferably going through the porosity range of from about 15 to about 19% by volume, until finally, the porosity is the same as it is for the rest of the sheet (in wet-laid gasketing this is typically in the range of from about 20 to 50% by volume). The porosity gradient ends where the pressure in the pressing step was substantially zero.

Advantageously, having the porosity gradient (or tapered densification) in the bolt area will improve bolt stretch retention in the bolt. The initial gasket seal is improved, and the retention of the gasket seal over time is also improved. Comparative experimental data in fact shows that the sealing ability of a gasket having the preferred tapered densification through the bolt area to the aperture is better than the sealing ability of a gasket which has a bolt area that was uniformly pressed in the bolt area to uniformly densify the gasket throughout the bolt area.

The bolt area of the gasket extends outward, in all directions, from the place where the bolt is to be put (bolt aperture), through the center area to the outermost point of the bolt area which is some distance (at least about 2 mm, preferably 3.5 mm) away from the end of the center area.

The exact size of the bolt area tends to depend on the particular application for which the gasket is intended. Suitably, the bolt area can extend up to about 6 centimeters from the bolt aperture (as a radius), with the center area being in the range of from about 1 to about 20 mm wide. For a high load cast gasket, it is preferred that the bolt area extends from about 2 to about 6 centimeters from the bolt aperture. For a medium load gasket, it is preferred that the bolt area extends from 0.5 cm to about 4 cm; and for a high load stamped gasket, it is preferred that the bolt area extends from 0.5 cm to about 2.5 cm. The smallest center area of the bolt area, suitably, will be about 1 mm in diameter. The smallest bolt area, suitably, will be about 3 mm.

Preferably, when the gasket is pressed to lower the porosity in the bolt area, heat is applied. For the wet laid, compressible gasket, the temperatures used can suitably be in the range of from about 300° to about 450° F. When heat is used, an increase is seen in the mechanical performance of the gasket.

The inventions described herein are illustrated in and can be better understood with the following examples. These examples are thus intended to illustrate the present invention and should not be taken to limit it. All parts and percentages are by weight unless otherwise indicated.

EXAMPLES

Examples 1–3

In order to compare the effects of different types of bolt areas on gasket sealing ability, three identical gaskets were cut from a single, wet-laid, fibrous gasket sheet material. The identical gaskets were rectangular, measuring 4.75 inches by 3.875 inches on its outside perimeter, with an interior opening measuring 3.5 inches by 2.625 inches respectively. Each gasket had four bolt holes, one in each corner of the rectangular gasket.

The gasket for Example 1 was allowed to remain as it was. Each of the bolt areas in the gasket for Example 2 were uniformly densified by pressing each corner between two metal plates in a hot press at about 15,000 PSI set at 300° F. By this method, the area around the bolt holes in the gasket of Example 2 was densified to a porosity of about 15% by volume up to a distance of approximately 0.25 inch away from the bolt hole. The area underneath the bolt was uniformly densified and did not taper in density. The densified area ended abruptly.

For Example 3, in the bolt areas, the gasket was tapered in density by putting uneven (non-uniform) pressure on the gasket in the bolt area, so that the porosity went from very low to high. The densification at the outer edges of the bolt area finally meeting the same porosity as is common to the rest of the gasket body (where it was not pressed). The area nearest the center, next to the bolt hole itself was the most dense. Near the bolt hole the gasket had a calculated porosity of about 15%. Over a distance of about 0.5 inch, the density of the gasket tapered so that the porosity climbed from 15% by volume, through the porosity range of from about 15 through about 19% porosity, to the final porosity level calculated for the rest of the gasket (in the range of from about 33% by volume).

Sealability Test for Examples 1–3

Each of these gaskets were tested to compare the seal that each gasket was capable of holding. In this test, the gasket was fitted to a steel plate, and a cover was bolted down on the plate. Each of the gaskets were given the same amount of torque over the bolts (24 Neuton-meter). For each gasket, the space in between the steel plate and the cover was pressurized with nitrogen to a level of 10 PSI (pounds per square inch), and the amount of time it took for the pressure to slip to 9 PSI was measured. The length of time that it took for each example is given in Table 1 below. The longer the time the better the seal.

TABLE 1

| Example | Air Leak Time (seconds) |
|---------|------------------------|
| 1 | 101 |
| 2 | 166 |
| 3 | 370 |

It is noted that the best seal was obtained with the gasket having the tapered densification. Uneven pressure had been used to press the bolt hole areas for the gasket of Example 3, so that the gasket had a porosity gradient through the bolt hole area.

Examples 4–7

In order to compare the effects of different types of bolt areas on gasket sealing ability, four identical gaskets were cut from a single, wet-laid, fibrous gasket sheet material. The identical gaskets were rectangular, measuring 4.75 inches by 3.875 inches on its outside perimeter, with an interior opening measuring 3.5 inches by 2.625 inches respectively. Each gasket had four bolt holes, one in each corner of the rectangular gasket.

The gasket for Example 4 was allowed to remain as it was. Each of the bolt areas in the gasket for Example 5 were uniformly densified by pressing each corner between two metal plates in a hot press at about 15,000 PSI set at 300° F. By this method, the area around the bolt holes in the gasket of Example 5 was densified to a porosity of about 15% by volume up to a distance of approximately 0.25 inch away from the bolt hole. The area underneath the bolt was uniformly densified and did not taper in density. The densified area ended abruptly.

For Example 6, with the same method used for Example 5, each of the bolt areas in the gasket were uniformly densified to give the area around each of the bolt holes in the gasket, a substantially uniform porosity (of about 15% by volume) up to a distance of approximately 0.25 inch away from the bolt hole. In addition to this, each of the bolt areas was given a porosity gradient where the lowest porosity of the gradient was about 15% and surrounded the center area. Going away from the center area, the porosity of the gradient gradually increased until it extended to a distance of about 0.5 inch from the aperture at which point the gradient ended.

For Example 7, the bolt area around each bolt hole was given a porosity gradient which had the lowest porosity around and abutting the aperture, and had the highest porosity where the bolt area ended, about 0.5 inch from the aperture. Near the bolt hole the gasket had a calculated porosity of about 15%. Over a distance of about 0.5 inch, the density of the gasket tapered so that the porosity climbed from a maximum of 15% by volume, through the porosity range of from about 15 through about 19% porosity, and passed the porosity range of from about 20 to about 33% to the final porosity level calculated for the rest of the gasket (about 33% by volume).

Sealability Test for Examples 4–7

Each of these gaskets were tested to compare the seal that each gasket was capable of holding. The method used for Examples 1–3 was repeated for Examples 4–7. The length of time that it took for each example is given in Table 2 below.

TABLE 2

| Example | Air Leak Time (seconds) |
| --- | --- |
| 4 | 42 |
| 5 | 101 |
| 6 | 412 |
| 7 | 528 |

I claim:

1. A gasket comprising a compressible gasket sheet material having at least one bolt area which has an aperture for a bolt to be placed therein, wherein further the bolt area has a center area around and abutting the aperture and further has an area outside of and around the center area and which abuts the center area, further providing that there is a porosity gradient in the sheet material, the porosity gradient beginning at the aperture where porosity is low and going through the center area and through the bolt area outside of the center area, wherein porosity increases going away from the aperture, the porosity gradient ending where the bolt area terminates at which point the porosity of the gradient is highest, wherein the bolt area outside of the center area is at least about 2 millimeters wide.

2. A gasket as described in claim 1 wherein the porosity in the gradient of the center area is in the range of from about 1 to about 15% by volume.

3. A gasket as described in claim 1 wherein the porosity gradient goes through the range of from about 15 to about 19% porosity by volume in the bolt area outside of the center.

4. A gasket comprising a compressible gasket sheet material having at least one bolt area which has an aperture for a bolt to be placed therein, wherein further the bolt area has a center area around and abutting the aperture and further has an area outside of and around the center area and which abuts the center area, wherein the center area has a substantially uniform porosity and the bolt area outside of the center has a porosity gradient in the sheet material wherein the porosity of the center area is lower than any porosity in the gradient, further providing that the porosity of the gradient goes from low at all points nearest the center area and gets higher moving away from the center area to its highest point at the end of the bolt area, wherein the bolt area outside of the center area is at least about 2 millimeters wide, the porosity gradient ending where the bolt area terminates.

5. A gasket as described in claim 4 wherein the center area has a porosity in the range of from about 1 to about 15% by volume.

6. A gasket as described in claim 4 wherein the porosity gradient goes through the range of from about 15 to about 19% porosity by volume in the bolt area outside of the center.

7. A gasket comprising a compressible gasket sheet material having at least one bolt area which has an aperture for a bolt to be placed in, wherein further the bolt area has a center area around and abutting the aperture and further has an area outside of and around the center area and which abuts the center area, further providing that there is a porosity gradient, the porosity gradient beginning at the aperture where porosity is low and going through the center area and through the bolt area outside of the center area, wherein porosity increases going away from the aperture, the porosity gradient ending where the bolt area terminates at which point the porosity of the gradient is highest, wherein the bolt area outside of the center area is at least about 2 millimeters wide, wherein further the porosity gradient was made by a process comprising the steps of providing the compressible gasket sheet material with at least one aperture in a center area of the bolt area, the aperture being for a bolt to be placed in, and pressing the compressible gasket sheet material in the bolt area, wherein the bolt area has the compressible gasket sheet material around the aperture, wherein further the pressing is done with a means for pressing which puts uneven pressure on the compressible gasket sheet material in the bolt area, further providing that the uneven pressure specifically puts heavier pressure on the compressible gasket sheet material abutting and surrounding the aperture, and further puts lighter pressure on the gasket in the bolt areas away from the aperture so that the pressure tapers off to substantially zero, wherein the pressure goes from heavier to lighter in a gradient which extends at least about 2 millimeters beyond the center area before the pressure on the gasket reaches substantially zero, wherein said gradient is in a direction going directly away from the aperture.

8. A gasket comprising a compressible gasket sheet material having at least one bolt area which has an aperture for a bolt to be placed in, wherein further the bolt area has a center area around and abutting the aperture and further has an area outside of and around the center area and which abuts the center area, wherein the center area has a substantially uniform porosity and the bolt area outside of the center has a porosity gradient wherein the porosity of the center area is lower than any porosity in the gradient, further providing that the porosity of the gradient goes from low at all points nearest the center area and gets higher moving away from the center area to its highest point at the end of the bolt area, wherein the bolt area outside of the center area is at least about 2 millimeters wide, the porosity gradient ending where the bolt area terminates, wherein further the porosity gradient was made by a process which comprises the steps of providing the compressible gasket sheet material with at least one aperture in the bolt area for a bolt to be placed in, and pressing the compressible gasket sheet material in the bolt area, wherein the bolt area has the compressible gasket sheet material around the aperture, wherein further the pressing is done with a means for pressing which puts substantially uniform pressure on the compressible gasket sheet material in the bolt area around the aperture and extending to all points of the center area, and which further places a pressure gradient on all portions of the bolt area outside of the center area, wherein further the pressure gradient has heavier pressure in the bolt area around and abutting the center area, and further puts lighter pressure on the gasket in the bolt areas away from the center area so that the pressure tapers off to substantially zero, wherein the pressure goes from heavier to lighter in a gradient which extends at least about 2 millimeters beyond the center area before the pressure on the gasket reaches substantially zero, wherein said gradient is in a direction going directly away from the aperture.

* * * * *